May 18, 1948.  A. GAY  2,441,759
SYSTEM UTILIZING THE ENERGY OF THE WAVES
Filed July 4, 1945  3 Sheets-Sheet 1
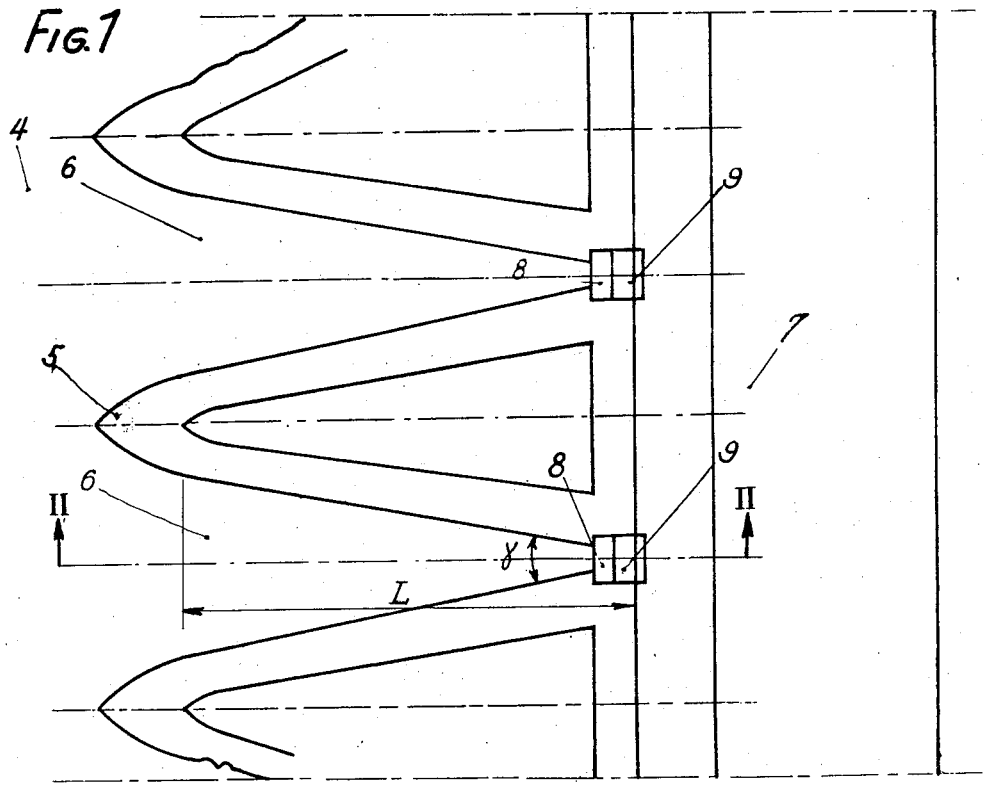
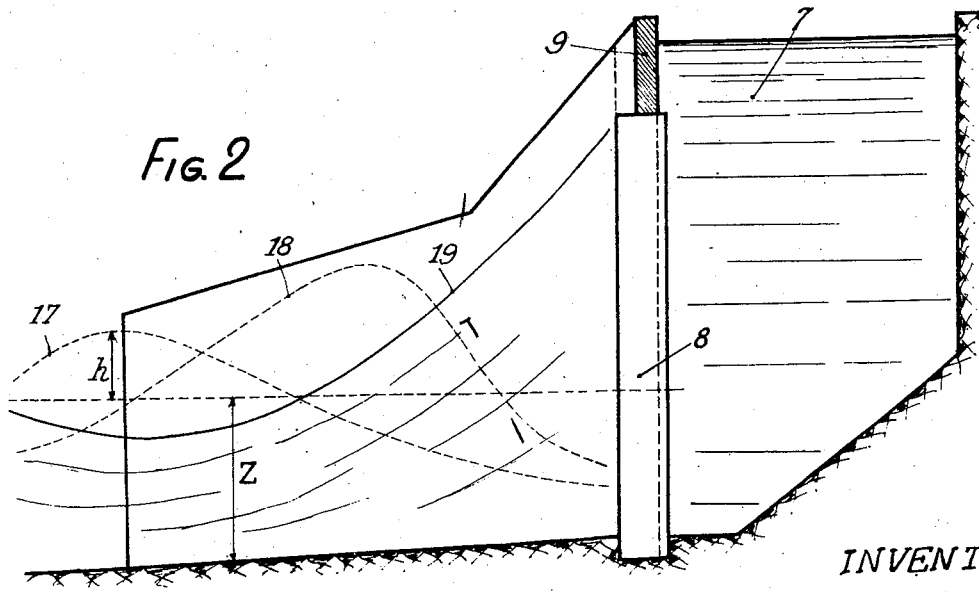
INVENTOR
Alphonse Gay
By George N. Casey
Attorney

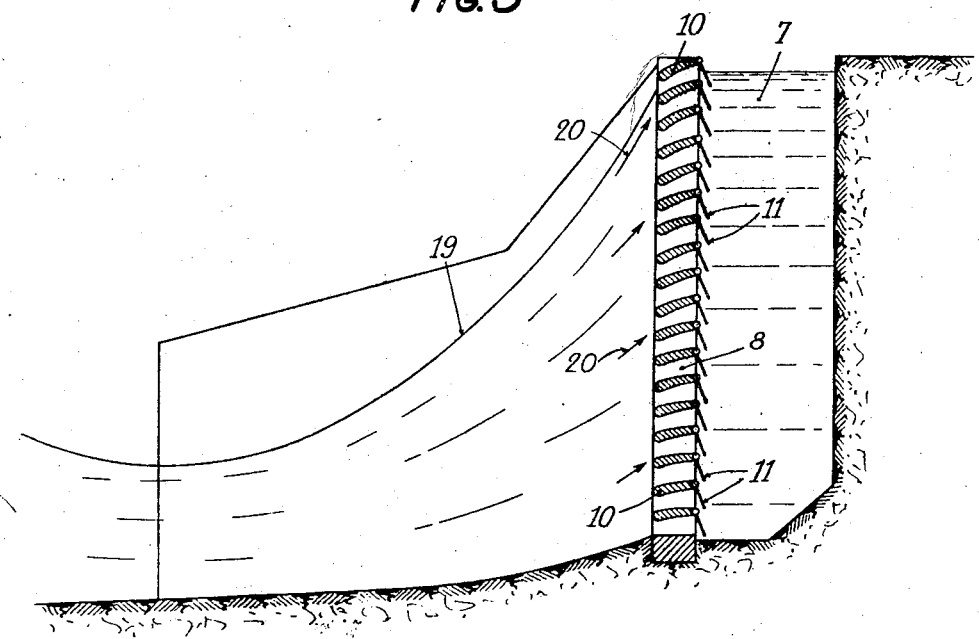

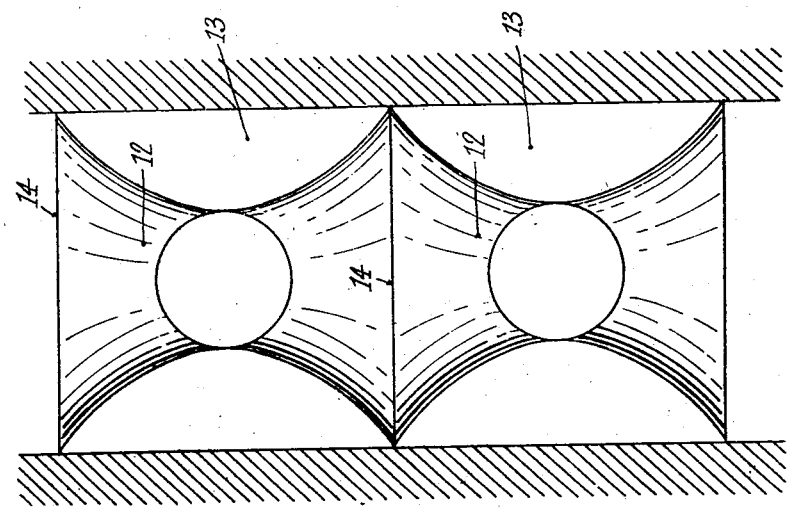
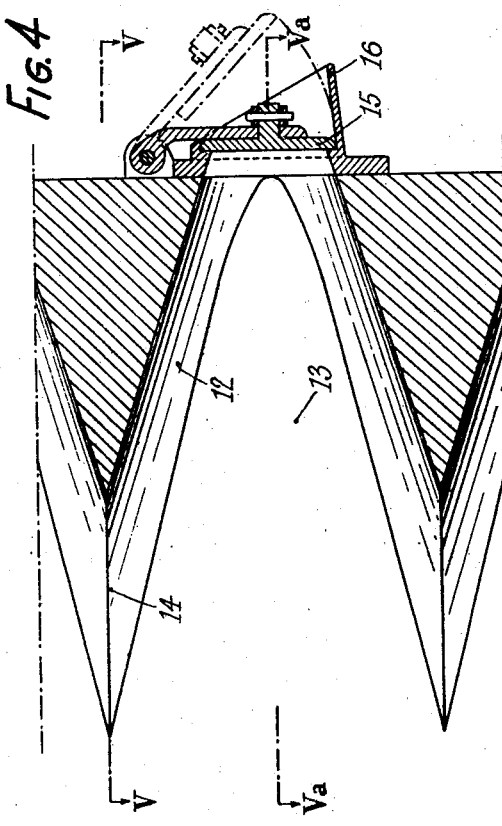
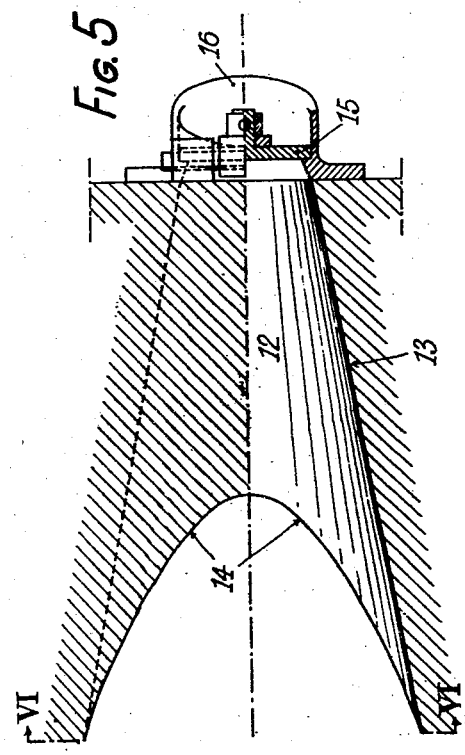

Patented May 18, 1948

2,441,759

UNITED STATES PATENT OFFICE 2,441,759

SYSTEM UTILIZING THE ENERGY OF THE WAVES

Alphonse Gay, Grenoble, France, assignor to Societe Mediterraneenne De L'Energie Marine, Grenoble, France Application July 4, 1945, Serial No. 603,226
In France December 24, 1940

6 Claims. (Cl. 61—20)

This invention refers to means of employing the energy of waves, and more particularly to systems of such form adapted to convert this energy into a useful form.

One of the objects thereof is to provide some means of employing the energy of the waves of oceans, seas, and lakes, the said means being of simple and practical construction and efficient in operation. Another object is to provide a system and arrangements capable of converting a high percentage of the energy contained in the waves into a useful form available for utilitarian purposes, as for instances, the feeding of docks or locks or the production of power. Another object is to provide an apparatus of the above nature durable in construction and capable of withstanding the impact of the waves for a practically indefinite period. Another object is to provide an apparatus capable of absorbing the energy of the waves under all conditions of tide heights. Other objects will be in part obvious and in part pointed out hereinafter.

Many well known apparatus of the prior art were meant to use the up and down motion of the waves to move floats working a reciprocating mechanism; such float devices have many drawbacks:

First their efficiency is small, owing to multiple transformations of energy, and then they can be used only by moderate seas when the available energy is small, and have to be withdrawn during heavy weather when the energy is greater.

Some other known forms of apparatus were also devised to use the up and down motion of the waves to compress air in an air chamber; they have the same drawbacks and, further, the so compressed air is not very useful.

In other known apparatus the horizontal flow produced by the waves in breaking over shallow bottoms or obstacles and sometimes rushing in a large funnel has been tried to work hydraulic wheels, to compress air and even to fill up a reservoir.

The breaking of the waves wastes much of their energy and that is the reason why the apparatus in which the waves break whether this is intended or not, or wherein the waves rush in indiscriminately, have such a low efficiency.

This invention eliminates the aforesaid drawbacks and consists in the features of construction, combination of elements and arrangement of parts which will be hereinafter described and the scope of application of which will be indicated in the following claims.

In the system according to the invention the waves are so directed, whatever their initial direction may be over a wide range of directions, that their energy is transformed into a more suitable form before encountering any movable mechanism.

This system comprises one or several units disposed side by side on a seafront; their dimensions and shape are well determined and their number only depends on topographical possibilities and on the total output wanted.

The accompanying drawings show, by way of example and more or less diagrammatically, several various possible embodiments of the invention.

Fig. 1 is a plan view of two units according to invention erected on the seafront.

Fig. 2 is a side elevation in cross-section of one of the units shown in Figure 1, the section being taken along the line II—II in the direction as indicated by the arrows.

Fig. 3 is a side elevation of the same unit in a modified form.

Fig 4 is a side elevation in cross-section shown on a bigger scale of a part of the unit and, Fig. 5 is a plan view in cross-section of the apparatus shown in Figure 4, the upper half of the section being taken along the line V—V and the lower part along the line Va—Va both in the direction as indicated by the arrows.

Fig 6 is a cross section along the line VI—VI of the apparatus shown in Figure 5.

In Figure 1, there is shown a portion of the sea 4 on the front of which is erected the structure 5 forming the aforesaid units according to the invention; one unit comprises one dihedral channel 6, contiguous or distant from the other neighbouring units. This channel opens outward to the sea and the incoming waves progressively change their characteristics in a way that renders easier their practical use. This channel will be termed a "concentrating channel."

The side walls of the channels are plane except for their outer ends which are curved to meet the walls of the next adjacent channels at either side as shown in Figure 1, whereby the projecting end of the structure 5 is wider and bears more resistance to the sea.

A reservoir 7 is situated behind the channels, being separated from the sea and filled up by the waves at a higher level than the mean sea level.

The side walls of the channels may be either built solid with the walls of the adjacent units as solid piers, or may be made up of individual walls making up hollow piers with the adjoining walls of the adjacent units.

The channels 6 communicate with the reservoir through an apparatus 8 located at their narrower ends. This apparatus comprises means for guiding the water moved by the waves, and a check valve system which lets the inward flow of water fill the reservoir but closes whenever there is a tendency for the water to flow in the reverse direction. The apparatus 8 extends from the bottom of the channel, which is disposed below low water level, as high up as the maximum height to which water is carried in passing inwardly from the channel 6. The water level in the reservoir can be still higher. If this is desired a water tight wall 9 may be installed on top of the apparatus 8, as shown in Fig. 2.

In Figure 3 there is shown a particular form of apparatus 8 consisting of several superposed streamlined guide vanes 10. These vanes can be plane or slightly curved to guide the flow of water better. They are adapted to the motions of the water near the waves and therefore the vanes in the bottom are practically horizontal, while the upper ones become gradually inclined. They support swing check valves 11. The vanes 10 are shown as fixed and disposed in spaced relation to one another from the bottom of the channel to its top. In Fig. 3 the reservoir is also shown as narrower than in Fig. 2 and it may be a flume leading the water where it is wanted.

In Figs. 4 and 5 is shown another form of apparatus for controlling the flow of water between the channel and the reservoir. It comprises several superposed convergent nozzles 12a and special swivelling check-valves 15. These convergent nozzles have a special shaped inlet and a circular outlet. They are formed by a portion of a hollow cone which is cut by the two converging walls 13 of the channel. The portions of the conic surfaces are shown at 12 and the continuations of the channel walls, which of course are plane are shown at 13. Reference 14 shows the edge of the partition between two contiguous cones.

The valve is supported adjacent the smaller base of the cone. These nozzles 12a may have an inclined position like the guide vanes 10 and the inclination of the nozzles is preferably made progressively greater from the lower ones upwardly. They may also be set up somewhat from the bottom of the channel.

The check-valves 15 are composed of circular swivelling gates, and the valve case is provided with a lip 16 surrounding the gate, whereby it remains relatively water tight on a part of its course.

According to one form of the invention the means for guiding the water from the channels to the reservoir and the valve system thereof may be set fast between the channel walls with the valves arranged so they may be taken off for the repairs.

In another embodiment of the invention, the whole apparatus comprising the guiding means and the valve system may be removable; this enables easy repairs and also the changing of the apparatus when the conditions of the sea vary, thereby maintaining the efficiency always at a maximum. If desired this apparatus may be built in one or several parts.

In any case, the form of the guiding means of such an apparatus will preferably vary from the bottom to the top according to the motions of the water in the waves at every height.

The action of the system above described is substantially as follows: turning now to Figs. 1 and 2 as a wave such as is shown in 17 at Fig. 2 reaches the mouth of the concentrating channel, it meets the laterally converging surfaces of the walls 5 of the channel. An interferential-like system settles along, the effect of which is to increase the amplitude of the undulatory motion, and, to quicken the velocity of propagation. The reference character 18 shows the same wave moving midway of the length of the channel and 19, the same reaching the end. In such a concentrating channel, the motions of the waves are analogous to what they are before entering the channel, although their amplitude and velocity are increased; for instance, a regular swell getting into the channels has a certain orbitary motion. The waves neither break nor form chopping or combing waves. This can only be achieved by giving the channel correct dimensions on the whole and in particular a sufficient depth to avoid the breaking of the waves. To avoid breaking, the depth must fulfill the following condition all along the channel, and of course in front of it:

$$Z > \frac{\tfrac{1}{2}T\sqrt{h}}{2} \text{ nat log } \frac{\tfrac{1}{2}T+\sqrt{h}}{\tfrac{1}{2}T-\sqrt{h}}$$

where:

$Z$ is the depth taken under the mean sea level;
$2h$ is the amplitude of the waves at the mouth of the channel; and
$T$ is the period of the waves.

Indeed, it is known that the value of the second member of the inequality represents the depth below which the waves would break. Provided that this condition is fulfilled, the floor of the channel may be horizontal or else slightly sloped upwardly from the sea, i. e., either plane as shown in Fig. 2 or curved upwards as shown in Fig. 3.

This breaking of the waves would actually limit the acceleration coefficient of the waves and absorb a considerable amount of energy. On the other hand, reflection of the waves must be avoided as the energy would be sent backwards.

Under the conditions of my experiments, I have found that the angle $\gamma$ of the dihedron should be chosen around 20° and the length of the channel around 15 meters; I mean the length of the channel as measured from the reservoir wall to the point of pronounced lateral inflection of the truncated walls, as shown in Fig. 1. However this length may vary with local conditions and especially with the wave-length. I have observed that the energy output of the channel varies approximately as its angle cosine; but this angle must stay above a certain figure otherwise the amplitude of the waves would not be properly increased.

According to my experiments, the increase of amplitude is roughly linear along the dihedral walls, and the final amplitude of the waves when they reach the apparatus 8 is about their amplitude at the mouth of the channel, multiplied by $2\cos\gamma$.

The height of the channel walls must be everywhere greater than the reach of the greatest utilized waves, considering that nothing must restrain this increase of amplitude.

When the waves reach the apparatus 8, the motions of the water in the bottom are roughly horizontal, but higher they become more and more vertical, so that if the channel was closed, or if the waves could directly get at the check-valves, a large quantity of water would then spurt upwards and thus waste much of the energy of the waves. Through the elements of the appartus 8, which I can call "deflectors," the water moved by the waves is guided more horizontally and the streams thus created can operate the check valves much more efficiently. In Fig. 3, references 20 show some arrows indicating the motions of the water; the curvature of the guide vanes 10 (Fig. 3) or their inclination as well as that of the convergent nozzles 12 (Fig. 4), must be adapted to the direction of these motions, so that a proper guiding is effected with a small loss of energy.

The deflectors 10 only guide the water, but the convergent nozzles 12 into which the partition 14 guides the water, also quicken the velocity of the liquid streams whereby the valves open more readily and can be made smaller and lighter, although the discharge is about the same, for the increase in velocity compensates for the reduction of the outlet area. This has great advantages, because the chief difficulty with the check-valves is to make them light enough to follow the impulses of the streams without any delay and shut as soon as there is the least tendency for the flow of the water to reverse.

If S be the inlet area of the nozzles and $S_1$ the outlet section area, such as $$S > S_1$$

there must be the following relating:

$$S < \frac{S_1 V}{\sqrt{2g - H}}$$

where V is the water velocity when it enters the nozzles, and H the head of the accumulated water above each nozzle. This means that the water velocity out of the nozzle, i. e.

$$u = V \frac{S}{S_1}$$

must be such that the velocity head $$\frac{u^2}{2g}$$

is greater than the head H, so that the valve will open. As the velocity out of the last check-valve on the top may be not negligible, the water can be raised in the reservoir higher than the crest of said waves; that is why in some cases a water tight wall may be set up on top of the apparatus 8, as shown in Fig. 2.

However, in the valve computation, care must be taken of all the flow and contraction coefficients depending on the actual shape of the water passages.

The nozzles are made as short as possible to avoid losses of head and nevertheless insure that they will work properly; their convergence is roughly equal to that of the channel.

Either the number of the deflectors, or their size or the size of the partition 14 may be the more reduced as the angle $\gamma$ of the channel is made smaller.

Whether a wall as 9 (Fig. 2) must be used or not depends on the amount of water that is drawn out of the reservoir. If this amount is wanted as large as possible, the apparatus 8, consisting of vanes or nozzles, should be set up as high as possible without any wall; on the contrary, if only a small supply of water is wanted there can be such a wall.

In this apparatus 8 all the valves from the bottom to the top can open and shut irrespective of each other according to the motions of the different parts of the waves which are thus fully used.

When ordinary check-valves are used, it is difficult to avoid losses of water before the valve shuts; but in the ordinary situation where such valves are used, if a check-valve lets a small amount of water flow back, it has no real importance because the duration of this backflow, and consequently the amount of water lost, is very small as compared with the useful flow. On the other hand, in such apparatus as is here under consideration, the duration of the positive discharge of the check valves represents only a small portion of the cycle, so that the reverse flow may be important in comparison with it and thus notably restrict the total output.

In the special device shown in Figs. 4 and 5, this drawback is eliminated; indeed, the check-valves open very readily and offer no more resistance to the inflow than other types of valve, while they are closed to any reverse flow before bearing on their seats, whereby this reverse flow is avoided, for it would precisely have happened mainly in the last part of the closing travel of the gates.

As a matter of fact, such properly shaped check-valves may likewise be used with the guide vanes apparatus shown in Fig. 3.

The check-valves deliver water into the reservoir which must be large enough to damp out the flow pulsation. This reservoir can be a compensating reservoir located in any convenient place, or if there is no space for it, it is reduced to a flume leading the water at the utilization apparatus or better to a further compensating reservoir.

If possible, there can be established an interseasonal reservoir; its size depending on the power of the whole installation, on the local possibilities, and on the oceanographic characteristics of the region. The reservoir may be built up or else a natural site may be used.

The reservoir being thus filled up water is impounded at a higher elevation than the mean sea level. Hence it can be used for utilitarian purposes, a water head having been created. For instance, the water can be used to work the turbines of a hydroelectric plant returning the water to an area sheltered from the waves, or it can be used to feed various basins of fish preserves, oyster-parks, harbour docks, locks, swimming pools, etc. Besides, as a large amount of water may be elevated in this manner, this invention makes it feasible to cause water to circulate in harbours, especially where sand banks readily form and need frequent dredging.

The available amount of water depends on the energy of the waves, on the discharge head, and on the total output. I have determined this out-put in my experiments; it varies according to the sea from 40% to 60% of the energy conveyed by the swell. The efficiency is the better as the waves are more regular and more like a perfect swell.

It is to be understood, that this invention can work with tides as well as without. If the water raised by the device according to the invention is returned back to the sea at once through the utilisation device, the total head may remain constant as both upstream and downstream levels vary by the same amount; on the other hand, if some water is impounded in the reservoir for a certain period, there results a time lag which involves changes in sea level; it thus becomes possible to devise various combinations suitable to particular combinations of waves and tides effects.

Thus the whole installation must of course be adapted to the tides: the depth of the concentrating channels must be sufficient to avoid the breaking of the waves even at low tide: the apparatus 8 must be high enough to work at all tide levels, be it only a part of the time. The height of the reservoir walls, etc., must be similarly determined.

The apparatus 8 can be moved up or down or another apparatus can be used according to the height of the tide.

As various possible embodiments might be made of the above invention, and as various changes might be made in the embodiments above set forth, it is to be understood that all matter herein set forth or shown in the accompanying drawings is to be interpreted as illustrative and not in a limiting sense.

I claim as my invention:

1. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said concentrating canal being defined by laterally spaced upright side walls extending upwardly to a height greater than the maximum amplitude attained by the waves in passing through said canal, said walls being further arranged to converge inwardly from the seaward side of said installation toward said impounding gate and having an angle of inclination to one another throughout the extent of their convergence which is below that at which pronounced reflections will be set up in the water contained in the waves passing therebetween, said canal further having the bottom surface thereof disposed a sufficient distance below the low tide level of the water entering said canal to insure against breaking of the waves in their passage through said canal to said gate.

2. An installation according to claim 1 wherein a plurality of canals are adjacently arranged in generally parallel relationship and wherein the adjacent side walls of two contiguous channels present substantially planar surfaces throughout the greater part of their extent in converging toward their respective impounding gates and at their seaward ends are curved outwardly into meeting engagement with one another.

3. An installation according to claim 1 wherein the impounding gate includes a series of vertically spaced check valves opening inwardly to the reservoir and a series of vertically spaced guide vanes disposed in front of said valves, said vanes defining therebetween a series of slightly curved passages for receiving the water from the wave and guiding it to said valves.

4. An installation according to claim 1 wherein the impounding gate includes a series of vertically spaced check valves opening inwardly to the reservoir and a series of vertically spaced guide vanes disposed in front of said valves, said vanes defining therebetween a series of slightly curved passages for receiving the water from the wave and guiding it to said valves, said vanes varying in their inclination to the horizontal from the lowermost to the uppermost in the series, the lowermost vanes being substantially horizontal and the highest being inclined upwardly at a considerable angle from the seaward side toward the associated check valve.

5. An installation according to claim 1 wherein the impounding gate includes a series of vertically spaced check valves of the gate type, said valves each having associated therewith a lip member extending about the periphery of said valve opposite the pivot point thereof and establishing a nearly watertight seal with the peripheral edges of the valve during the later stages of the closing movement thereof.

6. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said concentrating canal being defined by laterally spaced upright side walls extending upwardly to a height greater than the maximum altitude attained by the waves in passing through said canal, said walls being further arranged to converge inwardly from the seaward side of said installation toward said impounding gate and being inclined to one another throughout the extent of their convergence at an angle of not more than about 20°, said canal further having the bottom surface thereof disposed a sufficient distance below the low tide level of the water entering said canal to insure against breaking of the waves in their passage through said canal to said gate.

ALPHONSE GAY.

REFERENCES CITED

The following references are of record in the file of this patent:

UNITED STATES PATENTS

| Number | Name | Date |
| --- | --- | --- |
| 1,868,087 | Blair | July 19, 1932 |

Certificate of Correction

Patent No. 2,441,759. May 18, 1948.

ALPHONSE GAY

It is hereby certified that errors appear in the printed specification of the above numbered patent requiring correction as follows: Column 3, line 24, for the word "near" read *in*; line 25, for "in" after "vanes" read *near*; column 4, lines 18 and 19, for "getting into" read *entering*; line 32, for "taken under" read *measured from*; column 5, line 35, for "relating" read *relation*; column 6, line 39, for "at" after "water" read *to*; column 8, line 43, claim 6, for "altitude" read *amplitude*; and that the said Letters Patent should be read with these corrections therein that the same may conform to the record of the case in the Patent Office.

Signed and sealed this 10th day of August, A. D. 1948.

[SEAL]

THOMAS F. MURPHY,
*Assistant Commissioner of Patents.*